W. C. McGILL.
LAMP BURNER.
No. 76,645. Patented Apr. 14, 1868.
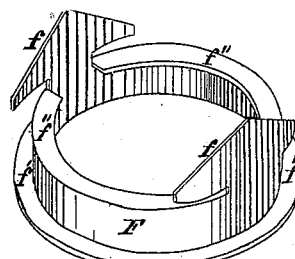
Fig. 3.
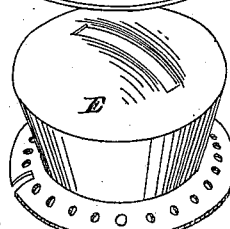
Fig. 2.
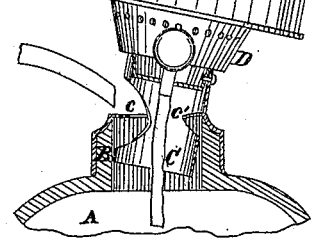
Fig. 1.
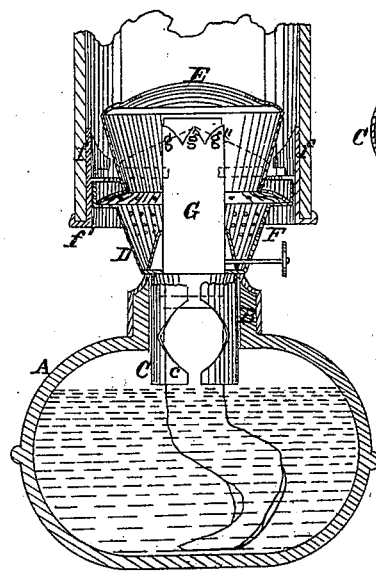
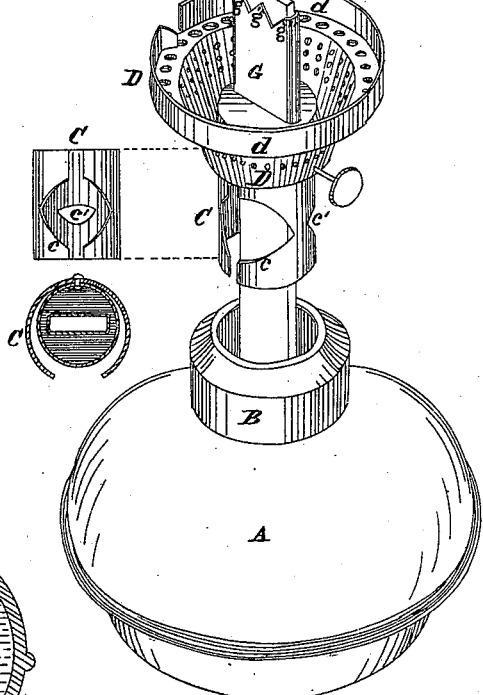
Inventor.
W. C. McGill
Attest.
J. H. Layman
C. K. Pickles

United States Patent Office.

WILLIAM C. McGILL, OF CINCINNATI, OHIO.

*Letters Patent No. 76,645, dated April 14, 1868.*

---

IMPROVEMENT IN LAMP-BURNERS.

---

*The Schedule referred to in these Letters Patent and making part of the same.*

---

TO WHOM IT MAY CONCERN:

Be it known that I, WILLIAM C. MCGILL, of Cincinnati, Hamilton county, Ohio, have invented a new and useful Lamp-Burner; and I hereby declare the following to be a full, clear, and exact description of the same, reference being had to the accompanying drawings, making part of this specification.

My improvement relates to, first, a device for enabling the feeding of the lamp without detaching either the burner or the chimney; secondly, a form of wick-tube by which the ascent of the oil in the upper part of the wick is properly directed and accelerated; thirdly, a form of air-conductor which secures an effectual and copious draught; fourthly, an improved form of chimney-holder.

Figure 1 is an axial section through a lamp-burner embodying my improvements.

Figure 2 is a perspective view of the parts of the burner detached.

Figure 3 is a side elevation of the burner in position for charging the lamp with oil.

A represents the oil-receptacle, of customary construction, save that its neck B, instead of the usual screw-thread, has a smooth interior to receive the smooth cylindrical spring-stem C, having an opening, $e$, to admit of its expansion into the neck B, as well as to enable the lamp to be charged with oil, and an opening, $e'$, to support the burner in the elevated position shown in fig. 3, for the purpose of said charging action, without entirely detaching said burner.

D is a collar, freely perforated to admit draught-air, and having a raised margin, $d$, to confine the air-conductor E, and also to support on its outside periphery a nicely-fitted ring or ferrule, F, having two or more elastic wings, $f$, that fit and expand into the interior of the chimney, and a flange, $f'$, at bottom to support the same. The chimney, being furnished with this ferrule, is secured to its place on the lamp by being simply pressed over, so as to enclose the raised margin $d$ of the collar D, an interior flange, $f''$, preventing the chimney being pushed too far down. When it is desired to remove the chimney, the act is accomplished by simply lifting of the same.

In order to cause a free and active upward draught, I form the conductor E with an upward flare, so as to increase its capacity as the air contained within it becomes hotter, and thus to relieve the pressure and to facilitate the ascent of said air, thereby securing a more active draught.

For the purpose of more rapidly and effectually heating the oil as it ascends the wick, and of directing it to the proper points, I form the upper edge of the wick-tube G into serrations $g\ g'\ g''$, whose points, entering the flame, serve to conduct the heat downward and the oil upward. The central point $g'$ being in the hottest part of the flame, becomes effective to concentrate the upward flow of oil into said part, where it can be most thoroughly consumed.

If desired, the elastic wings $f$ may be permanently attached to the collar D, thus dispensing with a separate ring, F, the chimney being shipped and unshipped by drawing on and off of the wings.

It will be seen that a burner provided with my elastic and perforated tubular or hollow stem C, while very easily and quickly elevated for refilling, does not require to be ever wholly withdrawn from the reservoir, and that in its closed condition it does not necessitate any unusual or inconvenient length of burner or of wick, and that it can be very cheaply and easily manufactured, dispensing entirely with the use of the customary screw, the elastic springs holding it in place and insuring a tight joint. The ring F and the elastic wings $f$ may, if preferred, be permanently attached to the air-conductor E.

I claim herein as new, and of my invention—

1. The elastic, tubular, and perforated stem C, substantially as described and shown, for the purposes set forth.

2. The combination of the collar D, tube G, ring F, with elastic wings $f\,f$, all constructed and arranged substantially as shown, and for the purposes herein set forth.

3. The conductor E, formed and arranged as and for the purpose set forth.

4. The combination of the ring F and elastic wings $f\,f$ and air-conductor E, when constructed and arranged as herein shown and described, and for the purposes heretofore set forth.

In testimony of which invention, I hereunto set my hand.

WM. C. McGILL.

Witnesses:
JAMES H. LAYMAN,
C. K. PICKLES.